United States Patent
Blumer et al.

(10) Patent No.: US 10,550,308 B2
(45) Date of Patent: Feb. 4, 2020

(54) PREFLUSH CHEMICALS FOR SCALE INHIBITOR SQUEEZE

(71) Applicant: ConocoPhillips Company, Houston, TX (US)

(72) Inventors: David Blumer, Bartlesville, OK (US); Ying Xu, Houston, TX (US); Greg McLelland, Houston, TX (US); Judy Waters, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/159,585

(22) Filed: Oct. 12, 2018

(65) Prior Publication Data

US 2019/0040299 A1 Feb. 7, 2019

Related U.S. Application Data

(62) Division of application No. 15/457,617, filed on Mar. 13, 2017, now abandoned.

(60) Provisional application No. 62/307,126, filed on Mar. 11, 2016.

(51) Int. Cl.
*E21B 37/06* (2006.01)
*C09K 8/528* (2006.01)

(52) U.S. Cl.
CPC .............. *C09K 8/528* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 6,911,417 B2 * | 6/2005 | Chan | C09K 8/52 166/311 |
| 8,653,008 B2 * | 2/2014 | Selle | C09K 8/528 166/308.6 |
| 2002/0150499 A1 * | 10/2002 | Reizer | C02F 5/12 422/12 |
| 2014/0284053 A1 * | 9/2014 | Germack | C09K 8/584 166/279 |

* cited by examiner

Primary Examiner — Andrew Sue-Ako
(74) Attorney, Agent, or Firm — Boulware & Valoir

(57) ABSTRACT

A method and system for removing water from the near wellbore during scale inhibitor squeeze treatments.

14 Claims, 9 Drawing Sheets

| TRITON GR-5M | DIOCTYL SODIUM SULFOSUCCINATE |
|---|---|
| TRITON X-15 | OCTOXYNOL-1 |
| TRITON X-35 | OCTOXYNOL-3 |
| TRITON X-45 | OCTOXYNOL-5 |
| TRITON X-100 | OCTOXYNOL-9 |
| TRITON X-102 | OCTOXYNOL-13 |
| TRITON X-114 | OCTOXYNOL-8 |
| TRITON X-165, 70% | OCTOXYNOL-16 |
| TRITON X-305, 70% | OCTOXYNOL-30 |
| TRITON X-405, 70% | OCTOXYNOL-40 |
| TRITON X-705, 70% | OCTOXYNOL-70 |

| PRODUCT PROPERTIES | 215 CS UP | 225 DK | GLUCOPON® LINE<br>425 N/HH | 600 CS UP | 650 EC |
|---|---|---|---|---|---|
| C-CHAIN | C8-10 | C8-10 | C8-14 | C12-14 | C8-14 |
| DP (APPROX) | 1,5 | 1,7 | 1,5 | 1,4 | 1,5 |
| APPEARANCE | YELLOWISH, SLIGHTLY CLOUDY LIQUID | BROWNISH LIQUID | YELLOWISH LIQUID | YELLOWISH, SLIGHTLY CLOUDY PASTE | YELLOWISH, SLIGHTLY CLOUDY LIQUID |
| ACTIVE SUBSTANCE [%] | 62-65 | 68-72 | 48-52 | 50-53 | 50-53 |
| WATER CONTENT [%] | 35-38 | 28-32 | 48-52 | 47-50 | 47-50 |
| VISCOSITY | 3.000-4.000 mPa.s, 20°C | 3.500-5.000 mPa.s, 20°C | 300-600 mPa.s, 20°C | 2.000-4.000 mPa.s, 40°C | 1.500-3.000 mPa.s, 20°C |
| pH VALUE | 11.5-12.5 (10%) | 6.0-9.0 (10%) | 7.0-9.5 (20%) | 11.5-12.5 (20%) | 11.5-12.5 (20%) |
| STORAGE TEMPERATURE [°C] | <40°C | <40°C | <40°C | <50°C | <40°C |
| BIODEGRADATION (OECD 301 A-F) | READILY | READILY | READILY | READILY | READILY |
| COMPLIANT WITH EU-DETERGENT REGULATION | ✓ | ✓ | ✓ | ✓ | ✓ |

FIG. 5A

| TOMADOL CC-n SURFACTANT | CARBON CHAIN PRESENT | $RO(CH_2CH_2O)_nH$ |
|---|---|---|
| TOMADOL 91-n SURFACTANT | $C_9/C_{10}/C_{11}$ | R- HYDROPHOBIC PORTION OF MOLECULE OBTAINED FROM A LINEAR ALCOHOL OF CARBON LENGTH CC |
| TOMADOL 1-n SURFACTANT | $C_{11}$ | |
| TOMADOL 23-n SURFACTANT | $C_{12}/C_{13}$ | |
| TOMADOL 25-n SURFACTANT | $C_{12}/C_{13}/C_{14}/C_{15}$ | n- AVERAGE MOLES OF ETHYLENE OXIDE PER MOLE OF ALCOHOL |
| TOMADOL 45-n SURFACTANT | $C_{14}/C_{15}$ | |

FIG. 6A

| PRODUCT | CTFA / INCI NAME |
|---|---|
| TERGITOL NP-30 | NONOXYNOL-30 |
| TERGITOL 15-S-3 | C11-C15 PARETH-3 |
| TERGITOL 15-S-5 | C11-C15 PARETH-5 |
| TERGITOL 15-S-7 | C11-C15 PARETH-7 |
| TERGITOL 15-S-9 | C11-C15 PARETH-9 |
| TERGITOL 15-S-12 | C11-C15 PARETH-12 |
| TERGITOL 15-S-15 | C11-C15 PARETH-15 |
| TERGITOL 15-S-20 | C11-C15 PARETH-20 |
| TERGITOL 15-S-30 | C11-C15 PARETH-30 |
| TERGITOL 15-S-40 | C11-C15 PARETH-40 |
| TERGITOL TMN-3 | ISOLAURETH-3 |
| TERGITOL TMN-6 | ISOLAURETH-6 |
| TERGITOL TMN-10 | ISOLAURETH-10 |
| TERGITOL XD | PPG-24-BUTETH-27 |

FIG. 6B

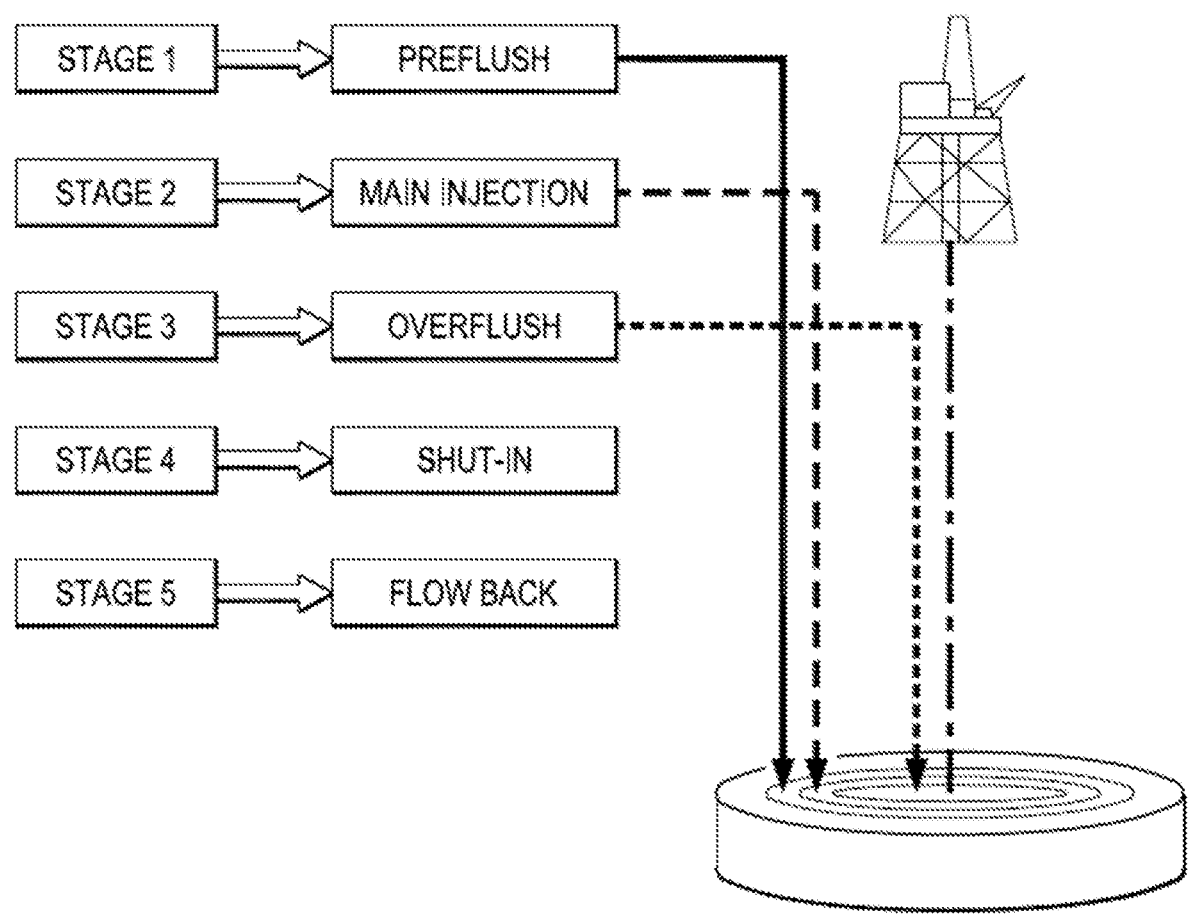

PREFLUSH CHEMICALS FOR SCALE INHIBITOR SQUEEZE

CROSS-REFERENCE TO RELATED APPLICATIONS

This application is a non-provisional application which claims benefit under 35 USC § 119(e) to U.S. Provisional Application Ser. No. 62/307,126 filed Mar. 11, 2016, entitled "Preflush Chemicals for Scale Inhibitor Squeeze," which is incorporated herein in its entirety.

STATEMENT REGARDING FEDERALLY SPONSORED RESEARCH

None.

FIELD OF THE INVENTION

The invention relates to products, methods and systems for controlling the deposition of scale in and near wellbores, such as oil and gas wellbores.

BACKGROUND OF THE INVENTION

Scale is a persistent problem for the production of oil and gas. As brine, oil, and/or gas proceed from the formation to the surface, the pressure and temperature change and dissolved salts can precipitate. This is called "self-scaling." If brine is injected into the formation to maintain pressure and sweep the oil to the producing wells, there will eventually be a commingling with the formation water, and additional salts may precipitate. This is called scaling from "incompatible waters."

The most common oilfield scales are calcite (most stable polymorph of calcium carbonate or $CaCO_3$), barite ($BaSO_4$), celestite ($SrSO_4$), anhydrite (anhydrous calcium sulfate or $CaSO_4$), gypsum ($CaSO_4.2H_2O$), iron sulfide (FeS), and halite (rock salt of NaCl). "Exotic" scales such as calcium fluorite (halide mineral composed of calcium fluoride, $CaF_2$), zinc sulfide (ZnS), and lead sulfide (PbS and $PbS_2$) are sometimes found with high temperature/high pressure (HT/HP) wells.

Calcite deposition is generally a self-scaling process. The main driver for its formation is the loss of $CO_2$ from the water to the gas phase(s) as pressure falls. This removes carbonic acid from the water phase, which had kept the basic calcite dissolved. Calcite solubility also decreases with increasing temperature (at constant $CO_2$ partial pressure).

Halite scaling is also a self-scaling process. The drivers are falling temperature and evaporation. Halite solubility in water decreases with decreasing temperature, favoring halite dropout during the production of high total dissolved solids (TDS) brines to the surface. Falling pressure has a much smaller effect on decreasing halite solubility. Evaporative loss of liquid water is generally the result of gas breakout from under-saturated condensate and oil wells, as well as the expansion of gas in gas wells. This increase in water vapor can leave behind insufficient liquid water to maintain halite solubility in the co-produced brine phase. Halite self-scaling is found with both high-temperature and low-temperature wells [e.g., with 125 and 350° F. bottomhole temperature (BHT) gas/gas condensate wells].

Barite scales are generally the result of mixing incompatible waters. For example, seawater is often injected into offshore reservoirs for pressure maintenance. Seawater has high-sulfate content; formation waters often have high-barium contents. Mixing these waters results in barite deposition. If this mixing/precipitation occur within the reservoir far from a vertical wellbore, there will generally be little impact on the production of hydrocarbons, but scaling near or within the wellbore will have a significant impact on production. Mixing of incompatible waters within the sandpack of a hydraulically fractured well can also be detrimental to production. Furthermore, after the initial, large deposition of scale, this water continues to be saturated in barite and additional barite scale may continue to form in the wellbore as pressure and temperature fall.

Waterfloods combining ground waters with high calcium and high sulfate contents can deposit anhydrite or gypsum by much the same "incompatible waters" mechanism discussed for barite. However, calcium sulfate scale solubility, unlike that of barite scale, actually increases with decreasing temperature (until about 40° C.), although this can vary with NaCl concentration. This can decrease the likelihood of scale after the initial mixing deposition. The reversal in solubility falloff below 40° C. accounts for the gypsum scaling observed in surface equipment. This inverse temperature effect can result in the generation of anhydrite scale when injecting seawater. Anhydrite solubility falls as pressure falls. Data could not be found for gypsum solubility vs. pressure.

Iron sulfide scales are almost ubiquitous when hydrogen sulfide is produced—frequently the result of tubular corrosion in the presence of $H_2S$. The chemistry is complicated; more than one iron sulfide phase can be present. The physical properties of the phases vary (sometimes dense, sometimes not), and the phase composition can change with time.

Scaling damage can be very rapid, and the effects quite expensive. In one North Sea well (Miller field), for example, production fell from 30,000 BPD to zero in just 24 hours because of scaling. The cost for cleaning out the single well and putting it back on production was approximately the same as the chemical costs to treat the entire field. While not all wells are susceptible to such momentous penalties for allowing scaling to begin, there is no question that scale prevention, formation, and remediation, have associated costs.

It is anticipated that oilfield scaling problems will continue to worsen and become more expensive. The new drivers are:

Tendency to longer tiebacks
Use of smart wells (integrity more critical)
More gas production (gas well formations tend to be more delicate)
Need to use greener chemicals
Increasing amounts of produced water.

Scale remediation techniques must be quick and nondamaging to the wellbore, tubing, and the reservoir. Selecting the best scale-removal technique for a particular well depends on knowing the type and quantity of scale, its physical composition, and its texture.

If the scale is in the wellbore, it can be removed mechanically or dissolved chemically. Mechanical methods such a milling and jetting, are among the most successful methods of scale removal in tubulars. Chemical dissolution of certain wellbore scales is generally relatively inexpensive and can used when mechanical removal methods are ineffective or costly. However, all chemical and mechanical removal methods are reactive, not proactive. The use of inhibitors to prevent scaling to begin with would be a proactive method of dealing with the scaling problem, and thus is generally preferred over reactive technologies.

Scale precipitation can be avoided by chelating the scaling cation. This is costly because the reactions are "stoichiometric," (e.g., one chelant molecule per one scaling cation). More effective however, are those chemicals that poison the growth of scale. These are "threshold" inhibitors, effectively inhibiting mineral scale growth at concentrations of 1,000 times less than a balanced stoichiometric ratio. Most inhibitors for inorganic scales are phosphorous compounds:

Inorganic polyphosphates
Organic phosphate esters
Organic phosphonates
Organic aminophosphates
Organic polymers A variety of scale inhibitors are well-known, and they are commercial available from many companies. Two chemical structures are shown in FIG. 1. These are used for the various carbonate and sulfate scales. Recently, the successful use of a nonphosphorus compound to inhibit halite precipitation has been described and field tested at moderate temperatures; more classical amine-based halite salt inhibitors are also available for halite inhibition.

The most frequently used method of delivering the inhibiting solution to the scaling brine has been the "inhibitor squeeze." Here, an inhibitor-containing solution is forced (hence the "squeeze" name) into the formation, whereby the inhibitor then resides on the rock surface, slowly leaching back into the produced-water phase at or above the critical concentration needed to prevent scaling [the minimum inhibitor concentration or "MIC"].

It is intended that the released inhibitor protect the tubulars, as well as the near wellbore. It is required, obviously, that the inhibitor adsorb on the formation rock with sufficient capacity to provide "long-term" protection. It is also required that the inhibitor be relatively stable to thermal degradation under downhole conditions and be compatible with the particular brine system. It is also important that the inhibitor treatment not cause a significant permeability reduction and reduced production. These requirements are generally achievable, but again, one chemical does not necessarily fit all field situations.

Two types of inhibitor squeeze treatments are routinely carried out where the intention is either to adsorb the inhibitor onto the rock by a physico-chemical process—an "adsorption squeeze"—or to precipitate (or phase separate) the inhibitor within the formation pore space onto the rock surfaces—a "precipitation squeeze."

Adsorption of inhibitors is thought to occur through electrostatic and van der Waals interactions between the inhibitor and formation minerals. The interaction may be described by an adsorption isotherm, which is a function of pH, temperature, and mineral substrate. The adsorption process for retaining inhibitor in the formation is most effective in sandstone formations. Treatment lifetimes are generally on the order of 3 to 6 months.

The "precipitation squeeze" process is based on the formation of an insoluble inhibitor/calcium salt. This is carried out by adjusting the calcium ion concentration, pH, and temperature of polymeric and phosphonate inhibitor solutions. Also used are calcium salts of phosphino-polycarboxylic acid or a polyacrylic acid scale inhibitor. The intent is to place more of the inhibitor per squeeze, extending the treatment lifetime. Normally, the precipitation squeeze treatment lifetime exceeds one year.

The engineering design of such adsorption and precipitation squeeze treatments into real-world multilayer formations is generally done with an appropriate piece of software. This simulator takes core flood data and computes the proper pre-flushes, inhibitor volumes, post flushes, and potential squeeze lifetime. Computer simulation of such chemistry is described in Shuler and Yuan.

A typical sequence of pumping steps involved in squeezing inhibitors is as follows:

Acid cleans the scale and debris out of the wellbore to "pickle" the tubing (this fluid should not be pushed into the formation).

"Spearhead" package (a demulsifier and/or a surfactant) increases the water wetness of the formation and/or improves injectivity.

A "preflush" fluid cleans hydrocarbon off rock surfaces and/or conditions the rock surfaces for adsorption of inhibitors.

Main scale-inhibitor treatment, which contains the inhibitor chemical, is normally in the concentration range of 2.5 to 20%.

An "overflush" fluid pushes the main scale inhibitor treatment to the desired depth in the formation away from the wellbore.

Shut-in or soak period (usually approximately 6 to 24 hours)—the pumping stops and the inhibitor adsorbs (phosphonate/polymers) or precipitates (polymers) onto the rock substrate.

The well is brought back to production, and the injection fluids backflow out of the well, followed by produced hydrocarbons.

FIG. 2 illustrates a typical inhibitor return curve that shows the concentration of an inhibitor dissolved in the water phase as the well is brought back on production. A large amount of inhibitor returns immediately after turning on the well. This is nonadsorbed inhibitor or weakly adsorbed inhibitor. It is "wasted" in the sense that it is not available for use late in the life of the squeeze. This wasted inhibitor does not otherwise impose a serious financial burden on the treatment—the inhibitors can be the cheapest part of the inhibition treatment. The plateau (or slowly declining) portion of the return curve is the critical data that describe the effectiveness of the treatment. As long as the curve is above the MIC, the well is considered protected from scaling. Immediately below the MIC, scale formation may start to occur, and the scale inhibitor squeeze needs to be repeated.

The x-axis in FIG. 2 is given in terms of time (months). The lifetime parameter is more correctly volumes of water produced. Obviously, a high rate of water passing over a given amount of inhibitor will maintain the MIC for a shorter period of time than a low rate of water passing over the same amount of inhibitor.

Scale-inhibitor squeeze treatments can have undesirable side effects. These side effects include: process upsets, poor process and discharged water quality on initial flowback, extended cleanup period, deferred oil, and the potential for a permanent decrease in oil production combined with an increase in water production. The first three side effects listed are functions primarily of the oil, brine, and squeeze chemicals. Most of these problems can be avoided, or at least minimized, by prior laboratory testing. Deferred oil is an intrinsic problem in well intervention. However, production being maintained at higher rate for longer time than if scale formed and caused rapid decrease or stop in production will pay for the deferred oil.

Permanent decreases in production after inhibitor squeeze treatments are usually associated with pumping large amounts of water-based chemicals into water-sensitive zones, assuming an otherwise proper treatment design and the use of clean fluids. Clay swelling and in-situ emulsions are damage mechanisms; low pH-inhibitor solutions are often detrimental to clays, in particular to chlorites.

Handling the scale inhibition of water-sensitive reservoirs is not a solved problem. Several routes of addressing the issue are being investigated. One solution is the use of oil-soluble inhibitors. Another is the use of water-in-oil emulsion ("invert emulsions"), similar to the invert emulsions used for time-delayed acidization. A third solution is the use of a mutual solvent preflush; however, mutual solvents are designed to prevent emulsion formation. Here, the mutual solvent is the first chemical seen by the sensitive formation, and it is the last seen as the well is put back on production. Also used are "clay stabilizers" in the preflush. As of this writing, no single approach solves all problems.

Thus, what is needed in the art are better methods of scale inhibitor squeeze especially methods that minimize water retention in the reservoir.

SUMMARY OF THE INVENTION

The present invention provides a novel method and system for controlling water damage that can occur on scale inhibitor squeeze treatments of wellbores.

The disclosure covers compositions, methods and systems of removing water injected into the near wellbore area during scale inhibitors squeeze treatments by the preflush composition. Distinctive from commercial preflush chemicals, which only remove hydrocarbon from formation rock, this preflush composition is capable of not only cleaning hydrocarbon from rock but also removing water left in the pores in the near wellbore area during flow back after the squeeze treatment. These preflush compositions are water-free mixtures of surfactants, co-surfactants, co-solvents, and hydrocarbons, which are capable of forming emulsions (especially microemulsions preferably Winsor Type III/IV) with water and therefore removing water from oil flow path while producing back after the squeeze treatment. The wells treated with the unique preflush chemicals produce oil at rates equal to or higher than before the scale inhibitor squeeze treatment.

The preflush chemicals are mixtures, with various formulations, of nonionic surfactants (alkylpolyglycoside, APG), cosurfactants (ethoxylated alcohol, EA), co-solvent (alcohol), and hydrocarbons (diesel), which are capable of forming emulsions, especially microemulsions, with water and therefore remove water from the oil production path while flowing back at the end of the squeeze treatment. To be effective, the formulations of the preflush chemicals have to be adjusted specifically for the fields to be treated. Lots of tests have been conducted for Alaska fields and the preflush system has been shown to be effective.

As with other commercial preflush chemicals, this preflush composition needs to be pumped before the aqueous main pill of the squeeze treatment. The proper sequence of a scale inhibitor squeeze treatment using these preflush chemicals is: 1. pump preflush composition; 2. pump main scale inhibitor solution; 3. pump overflush; 4. shut-in for certain period of time; 5. open the well for backflow and start the well in production mode. Alternatively, some wells may require another stage of the preflush composition after step 3, i.e. additional chemicals can be used as an overflush. Additional steps can be added, such as acid pretreatment or spearhead packages.

Preferred preflush compositions: (a) cause minimal formation damage (or <10% damage in core flood tests); (b) provide a maximum squeeze life (ca. 1 year is preferred, but 3-6 months is more typical); (c) are compatible with any incumbent corrosion inhibitor (>95% corrosion inhibitor performance); and (d) are compatible with reservoir brine (or other overflush fluid) and scale inhibitor chemicals. Other selection criteria also included environmental category, cost, impact on facilities, practicality of deployment and proven track record.

The invention comprises one or more of the following embodiments, in any combination:

A preflush solution for injection into a wellbore before a scale inhibitor squeeze treatment, said preflush solution comprising at least 90% petroleum miscible fluid, at least 1% alkyl polyglycoside at least 0.5% ethoxylated alcohol, and at least 1% linear alcohol, wherein said preflush solution forms a Winsor Type III or Type IV microemulsion with water.

A preflush solution for injection into a wellbore before a scale inhibitor squeeze treatment, said preflush solution comprising at least 90% diesel, at least 1% alkyl polyglycoside at least 0.5% ethoxylated alcohol, and at least 1% alcohol, wherein said preflush solution forms a Winsor Type III or Type IV microemulsion with water.

A preflush solution for injection into a wellbore before a scale inhibitor squeeze treatment, said preflush solution comprising at least 90% C8-C14 hydrocarbons, 1-5% alkyl polyglycoside, 0.5-5% ethoxylated alcohol, and 0.5-5% linear alcohol wherein said preflush solution forms a Winsor Type III or Type IV microemulsion with water.

Said alkyl polyglycosides can be C8-C16, said ethoxylated alcohols are C8-C15 with an average of about 2-14 ethylene oxide groups, and said alcohols are about C4-C15.

Said alkyl polyglycosides can be C10-C14 alkyl polyglucosides, said ethoxylated alcohols are C10-C12 with an average of about 12 ethylene oxide groups, and said alcohols are about C6-C12.

An improved method of scale inhibitor squeeze treatment, said treatment comprising injecting a scale inhibitor into a wellbore, injecting a push solution into said wellbore, shutting said well in for a period of time, and opening said well for flowback of said injected fluids and production of oil, the improvement comprising injecting a preflush solution as described herein into said wellbore before injecting a scale inhibitor into said wellbore.

A method for minimizing scaling in a reservoir, comprising: a) injecting the preflush solution as described herein into a wellbore in a reservoir; b) injecting a scale inhibitor fluid into said wellbore; c) injecting a push fluid to push the injecting a scale inhibitor fluid into the reservoir surrounding said wellbore; d) shutting in said wellbore for a period of time; e) opening said wellbore for backflow of said push fluid and said scale inhibitor fluid and lastly for backflow of said preflush solution; f) and producing a reservoir fluid from said wellbore.

A method wherein said preflush fluid penetrates at least 5 feet or at least 8 feet or more into said reservoir.

A method wherein said push fluid comprises brine or preflush solution.

A method, wherein said preflush solution forms a Type III or Type IV microemulsion with any water left behind from said backflowed push fluid and said scale inhibitor fluid, thus removing said water on backflow of said microemulsion.

A method wherein the rate of production of said reservoir fluid is at least as good after said method as it was before said method, or even better, wherein the rate of production of said reservoir fluid is improved after said scale inhibitor squeeze treatment method over what it was before said method.

As used herein "push" fluid and "overflush" are used interchangeably intended to refer to any fluid used to force the scale inhibitor into the formation, and is typically, (but not necessarily) brine. Diesel has also been used for overflush.

As used herein "pill" and "slug" are used interchangeably, and merely refer to a volume of scale inhibitor fluid injected or pumped into the well for the squeeze treatment.

As used herein, "backflow" or "back-production" refers to fluids moving back up and out of the well. Thus, when a well is opened, inherent pressure and/or pumps will cause the fluids therein to backflow, thus removing most treatment chemicals from the reservoir, and then producing hydrocarbon.

As used herein "providing" is intended to include use of existing equipment, as well as the provision of new equipment. Thus, providing a producing well can include using an existing well.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," and "include" (and their variants) are open-ended linking verbs and allow the addition of other elements when used in a claim. The phrase "consisting of" excludes other elements. The term "consisting essentially of" occupies a middle ground, allowing the inclusion of nonmaterial elements, such as buffers, varying salts, and the like, that do not materially change the novel features or combination of the invention.

The following abbreviations are used herein:

| | |
|---|---|
| EA | Ethoxylated alcohol |
| AES | alcohol ethoxysulfates |
| APG | Alkylpolyglycoside |
| BPD | barrels per day (aka BOPD, bbl/d, bpd, bd, or b/d) |
| cSOR | Cumulative steam to oil ratio |
| CSS | Cyclic steam stimulation, aka huff-an-puff |
| CWE | Cold water equivalent |
| ES-SAGD | Expanding solvent SAGD |
| JAGD | J-well SAGD |
| SAGD | Steam assisted gravity drainage |
| TDS | total dissolved solids |
| IFT | interfacial tension |

BRIEF DESCRIPTION OF THE DRAWINGS

The invention, together with further advantages thereof, may best be understood by reference to the following description taken in conjunction with the accompanying drawings in which:

FIG. 5A shows some exemplary GLUCOPONS® and 5B shows TRITONS®.

FIG. 6A shows some exemplary TOMADOLS® and 6B shows TERGITOLS®.

FIG. 7 shows a general scale inhibitor squeeze process.

DETAILED DESCRIPTION OF THE INVENTION

Figure 1:
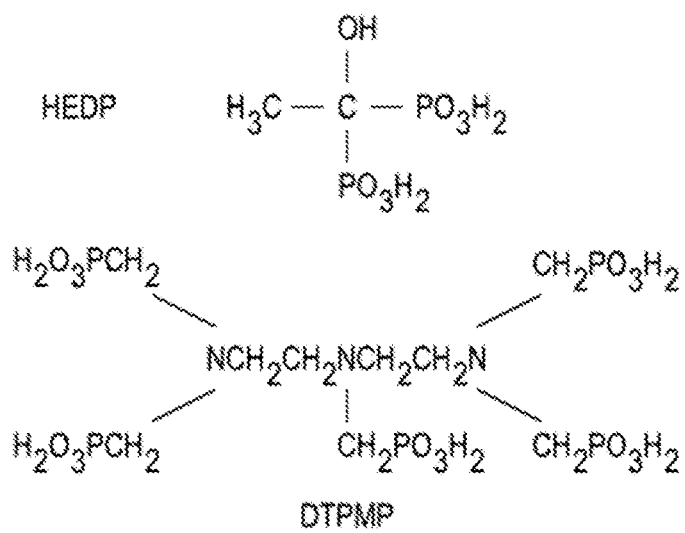
FIG. 1—The chemical structure of two phosphonate inhibitor molecules [hydroxyethylenediphosphonic acid (HEDP) and diethylenetriaminepenta (methylenephosphonic) acid (DTPMP)].
Figure 2:
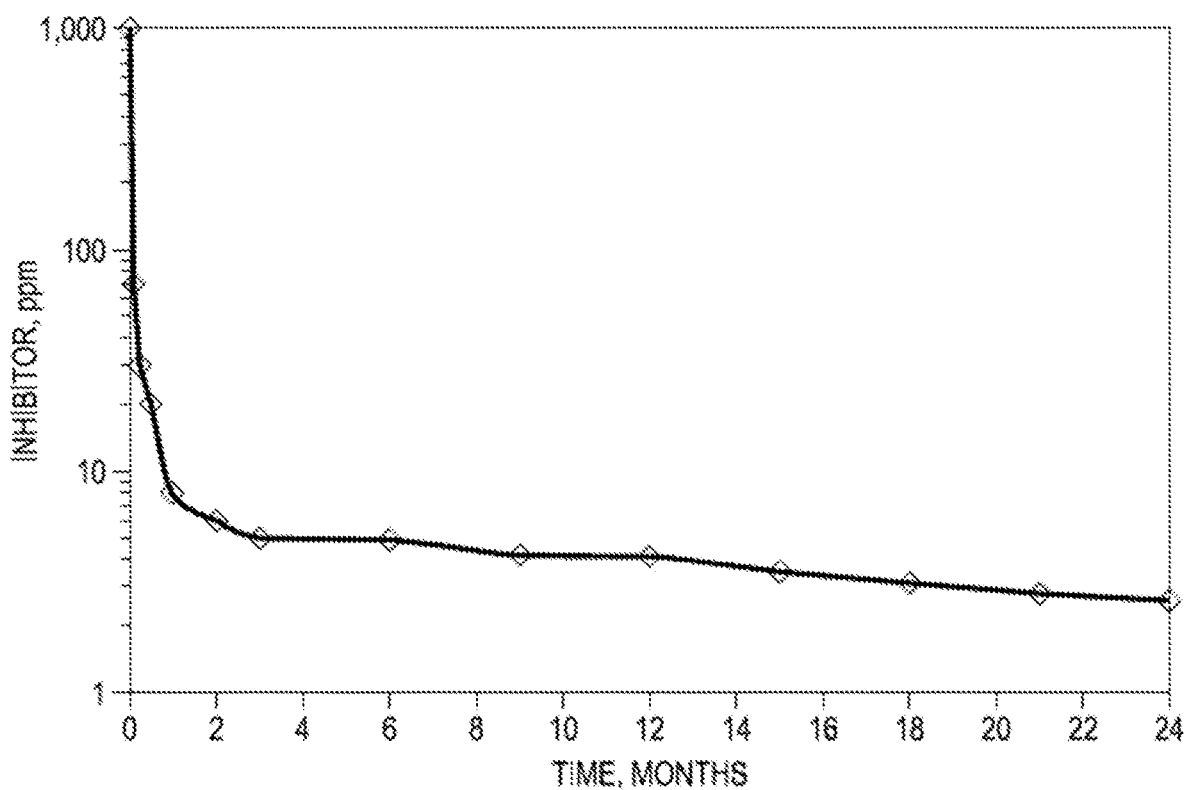
FIG. 2 illustrates a typical inhibitor return curve that shows the concentration of an inhibitor dissolved in the water phase as the well is brought back on production.

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents. Scale inhibitors are usually water soluble. However, some oil/gas producing formations are water-sensitive, and any water left behind in formation pores could reduce the oil/gas permeability. This will result in reduction of production levels, which can be significant depending on the severity of water-damage. On the other hand, if a well producing from a water-sensitive formation is not squeeze-treated to reduce or prevent, production could again be stopped due to the scaling of the near wellbore.

Currently there is no effective method to prevent formation damage caused by aqueous scale inhibitors squeeze treatment. Some wells producing from water-sensitive formations experienced serious production reduction and have to undergo well intervention to mill out the scales deposited in the wellbore. Recently, there were trials to replace certain percentage of water in the scale inhibitor pill or slug with glycol and a certain success was achieved. However, the treatment cost was higher than usual and some fields may be limited by source, storage of glycol and/or environmental restrictions.

Current commercial preflush chemicals only intend to remove crude from formation rock to clean the rock surface for scale inhibitor to absorb to. They are not targeted for water removal and thus cannot remove water from the near wellbore area.

The preflush compositions newly developed herein not only cleans hydrocarbon off rock, but also removes any water left in the near wellbore area. The preflush compositions can form emulsions, especially and mainly Winsor Type III or IV microemulsions therefore are capable of removing the water left by the main scale inhibitor pill in the near wellbore area. The emulsion formed will flow back to surface after the treated well is put on production.

Similar chemicals were developed in 2005 (e.g., U.S. Pat. No. 6,911,417), but the chemicals were used to clean water blockage issue after completion (using either oil- or water-based drilling mud/fluid) of well bores. Those chemicals are not used for routine preflush purposes during scale squeeze treatment of wells. Further, since they functioned at a different time, their optimization requirements would be different. The solutions developed herein have to be optimized so that they function well in combination with push fluids and well as with scale inhibitor fluids.

Figure 3A:
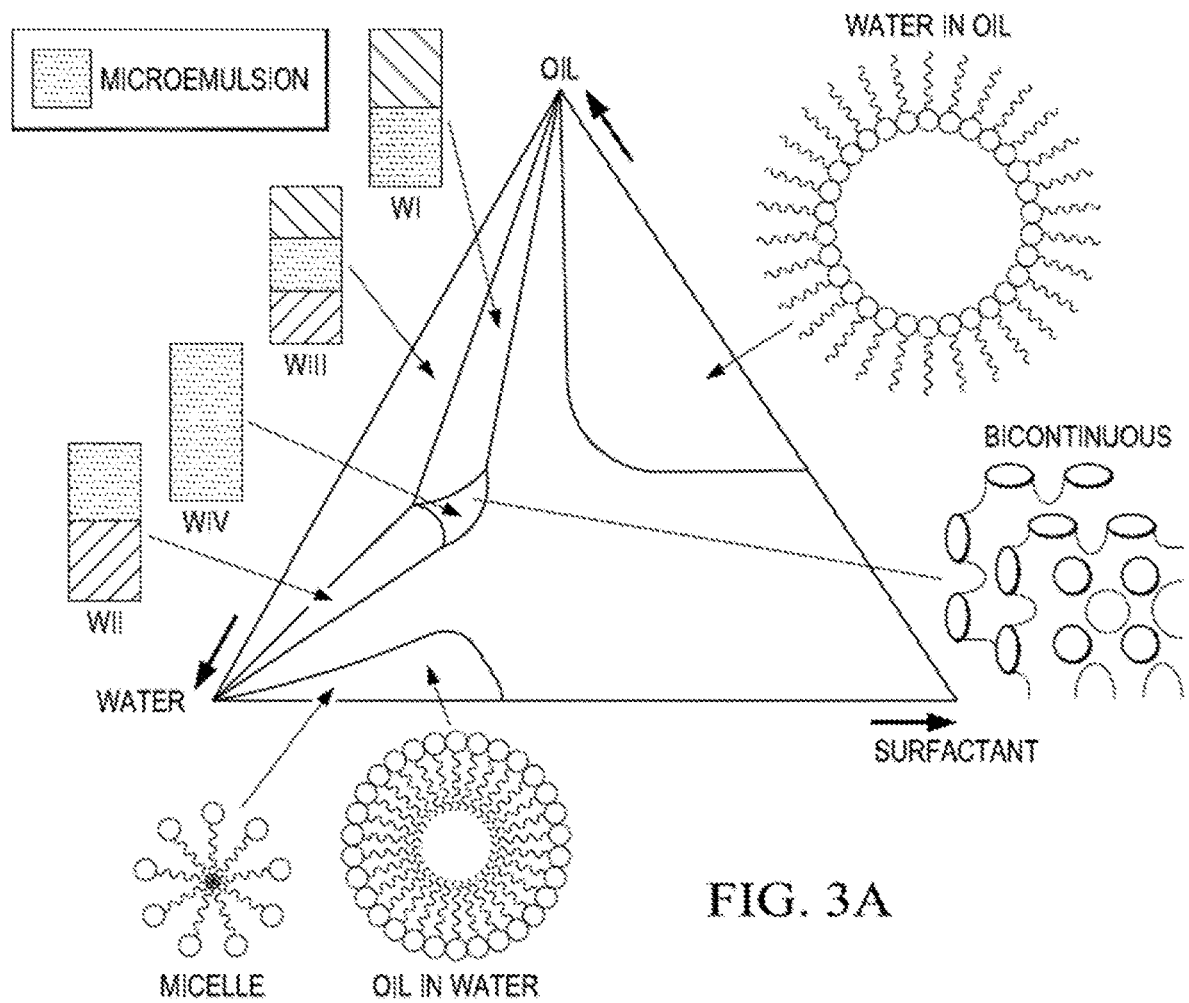
FIG. 3A shows a hypothetical ternary phase diagram representing three components of the system comprising oil water and surfactant wherein oil-in-water emulsion, water-in-oil emulsions and microemulsions are shown.

In addition to the well-known oil-in-water emulsion and water-in-oil emulsions there is a wide range of emulsifying behavior including the microemulsions. See e.g., FIG. 3A. A well-known classification of microemulsions is that of Winsor who identified four general types of phase equilibria:

Type I: the surfactant is preferentially soluble in water and oil-in-water (o/w) microemulsions form (Winsor I). The surfactant-rich water phase coexists with the oil phase where surfactant is only present as monomers at small concentration.

Type II: the surfactant is mainly in the oil phase and water-in-oil (w/o) microemulsions form. The surfactant-rich oil phase coexists with the surfactant-poor aqueous phase (Winsor II).

Type III: a three-phase system where a surfactant-rich middle-phase coexists with both excess water and oil surfactant-poor phases (Winsor III or middle-phase microemulsion).

Type IV: a single-phase (isotropic) micellar solution, that forms upon addition of a sufficient quantity of amphiphile (surfactant plus alcohol).

Figure 3B:
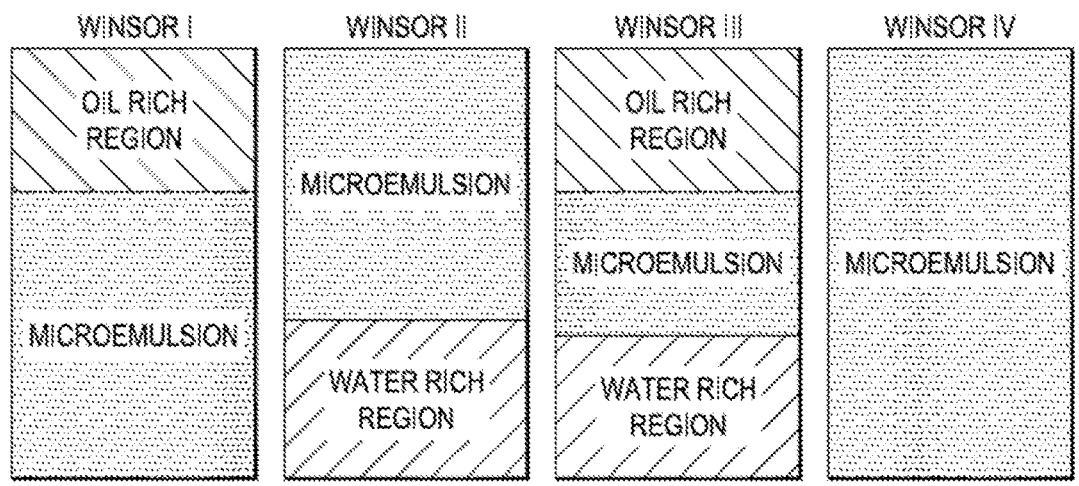
FIG. 3B shows the Winsor Type I-IV microemulsions.

These microemulsion types are shown schematically in FIG. 3B. As noted preferred preflush chemicals form Type III or Type IV microemulsions with any water in the reservoir, thus allowing water removal during preflush. Further, since the aqueous scale inhibitor squeeze pill is followed by the preflush during flowback, the preflush will also remove water left behind by the aqueous scale inhibitor squeeze pill.

Preflush 1: Diesel: 94.26%; GLUCOPON® 600 UP (aqueous dispersion, an APG): 2.51%; TOMADOL® 91-2.5 (nonionic surfactant, an EA): 1.09% and TOMADOL® 25-12 (nonionic surfactant, EA): 0.12%; n-hexanol: 1.00%; and n-octanol: 1.00%.

Preflush 2: Diesel: 94.28%; GLUCOPON® 600 UP (APG): 2.51%; TOMADOL® 91-2.5 (EA): 1.21%; n-butanol: 1.50%; n-hexanol: 0.50%.

Preflush 3: C8-C14 hydrocarbons 92%; GLUCOPON® 600 UP: 3%; TOMADOL® 91-2.5 (EA): 1%; n-butanol: 2%; n-hexanol: 1%.

Preflush 4: C10-C14 hydrocarbons 95%; TRITON® CG-600 (water soluble surfactant, an APG): 2%; TERGITOL® 15-S-3 Surfactant (nonionic, water insoluble surfactant, an EA): 2%; n-butanol: 0.5%; n-hexanol: 0.5%.

Preflush 5: Diesel: 90%; GLUCOPON® 600 UP (APG): 2.5%; TOMADOL® 91-2.5 (EA): 1.1%; TOMADOL® 25-12 (EA): 0.1%; n-hexanol: 1.0%; n-octanol: 1.0%.

Alkyl polyglycosides are a class of non-ionic surfactants widely used in a variety of household and industrial applications. They are derived from sugars and fatty alcohols; therefore, they are generally favored for their manufacture from renewable resources. The raw materials for industrial manufacture are typically starch and fat, and the final products are typically complex mixtures of compounds with different sugars comprising the hydrophilic end and alkyl groups of variable length comprising the hydrophobic end. When derived from glucose, they are known as alkyl polyglucosides.

Figures 4, 5B:
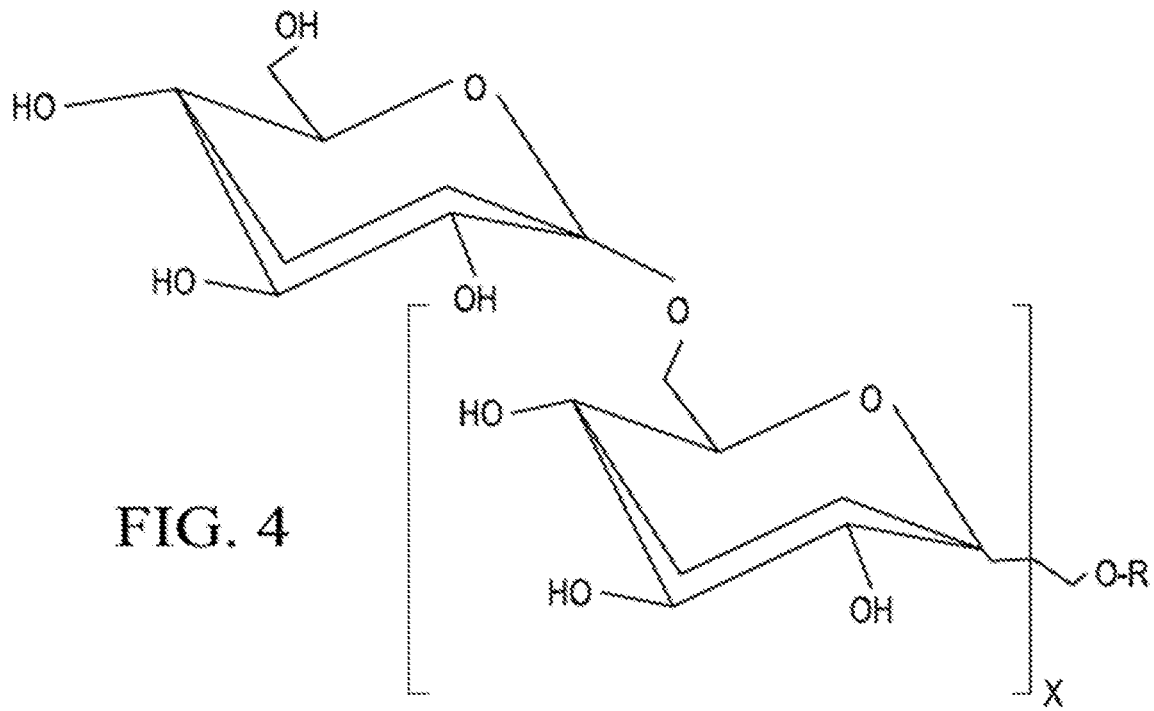
FIG. 4 shows the basic structure of an alkyl polyglucoside.

GLUCOPON® and TRITON® are two groups of alkyl polyglucosides. FIG. 4 shows the basic structure of an alkyl polyglucoside. A variety are available from e.g., BASF® or COGNIS® including GLUCOPON® 215 UP; GLUCOPON® 225 DK; GLUCOPON® 425 N/HH; GLUCOPON® 50 G; GLUCOPON® 600 UP (C10-C16 preservative free. 50-53% active. Lauryl/myristyl glucoside) and GLUCOPON® 650 EC (C8-C16 preservative free. 50-53% active. Alkyl polyglucoside). Some of the properties of similar surfactants available from COGNIS® are shown in FIG. 5A, some TRITONS are shown in FIG. 5B.

Alcohol ethoxylates (EA) and alcohol ethoxysulfates (AES) are non-wmc surfactants found in products such as laundry detergents, surface cleaners, cosmetics and for use in agriculture, textiles and paint. Carbon chain length is 8-18 while the ethoxylated chain is usually 3 to 12 ethylene oxides long in home products. They feature both a lipophilic tail (R) and a relatively polar head group ((OC2H4)nOH), making them ideal for this use. The AES surfactants may be less preferred, due to their sulfur content, but may be acceptable in certain reservoirs.

The TOMADOLs® are nonionic surfactants based on ethoxylated alcohols, and are available e.g., from AIR PRODUCTS® or TOMAH PRODCTS®. The TOMADOLs are named in the general format TOMADOL CC-n surfactant, where CC represents the number of carbon atoms present in the alkyl group (R) of the linear alcohol, and n indicates the average moles of ethylene oxide. See e.g., FIG. 6.

TERGITOLs are another nonionic surfactant based on a mixture of linear secondary alcohols reacted with ethylene oxide, and are available from many suppliers, including DOW® and SIGMA-ALDRICH®. The general formula is Cn-1sH23-310[CH2CH20]xH. TERGITOL® 15-S-3 for example, is a clear liquid, nonionic surfactant that is oil soluble.

Preferred APG are C8-C16 or C10-C14.

Preferred EA or EAS are C8-C15 carbon chain length alkyl groups with an average of about 10-14 and/or 2-8 ethylene oxide or ethoxysulfate groups.

Preferred alcohols are about C4-C8, and/or C6-C15.

The "petroleum miscible fluid" is any miscible with the crude hydrocarbons in the subterranean formation of interest, such as xylene, diesel oil, C10-C14 hydrocarbons, C8-C12 hydrocarbons, aliphatic or aromatic solvents, refinery streams suitable as a miscible solvent, and the like. A wide variety of suitable miscible materials are well known. Crude oil, while useable, may not be preferred since it may prevent the scale inhibitor from absorbing to the rock. Thus, typically a lighter fluid is used than the endogenous crudes.

The "push fluid" or "overflush fluid" can be any push fluid that functions to "push" or squeeze the scale inhibitor fluid into the reservoir. Such push fluids typically include brine or hydrocarbon.

The "scale inhibitor fluid" can be any known in the art, and typically includes four classes of compounds that have been widely applied in the oilfield: polyphosphates, phosphonates, phosphate esters, and polyacrylates/polyacrylamides. The scale inhibitor fluid can be immediately preceded by a pretreatment package, e.g., to increase wettability, if desired.

The preflush composition is used by injecting the composition into the near-wellbore portion of the subterranean formation at matrix rates (non-fracturing rates) out to a radial distance from about 0.5-5 or 2-3 feet from the wellbore to substantially fill the near-wellbore portion of the subterranean formation. This will be displaced another 5-8 feet or more once the scale inhibitor and push slugs are injected into the reservoir. This places the mixture, which typically comprises about 90-96 volume percent of the petroleum miscible liquid, in contact with a large range of near-wellbore formation.

The combination of the APG, EA/AES, and alcohols with the petroleum miscible fluid creates a mixture capable of forming a Winsor Type II or a Winsor Type III or Winsor Type IV microemulsion with water and crude positioned in the formation, thereby producing a very low interfacial tension (IFT) microemulsion system. The low IFT with the excess water phase allows the trapped water to be mobilized and displaced out of the formation. During backflow, the preflush will also collect water remaining behind by the scale inhibitor slug, which is typically an aqueous solution. If desired the push solution, which further pushes (squeezes) the scale inhibitor slug into the formation can also comprise preflush solution, but this is not necessary in many cases, and typical push fluids can be utilized.

Figure 8A:
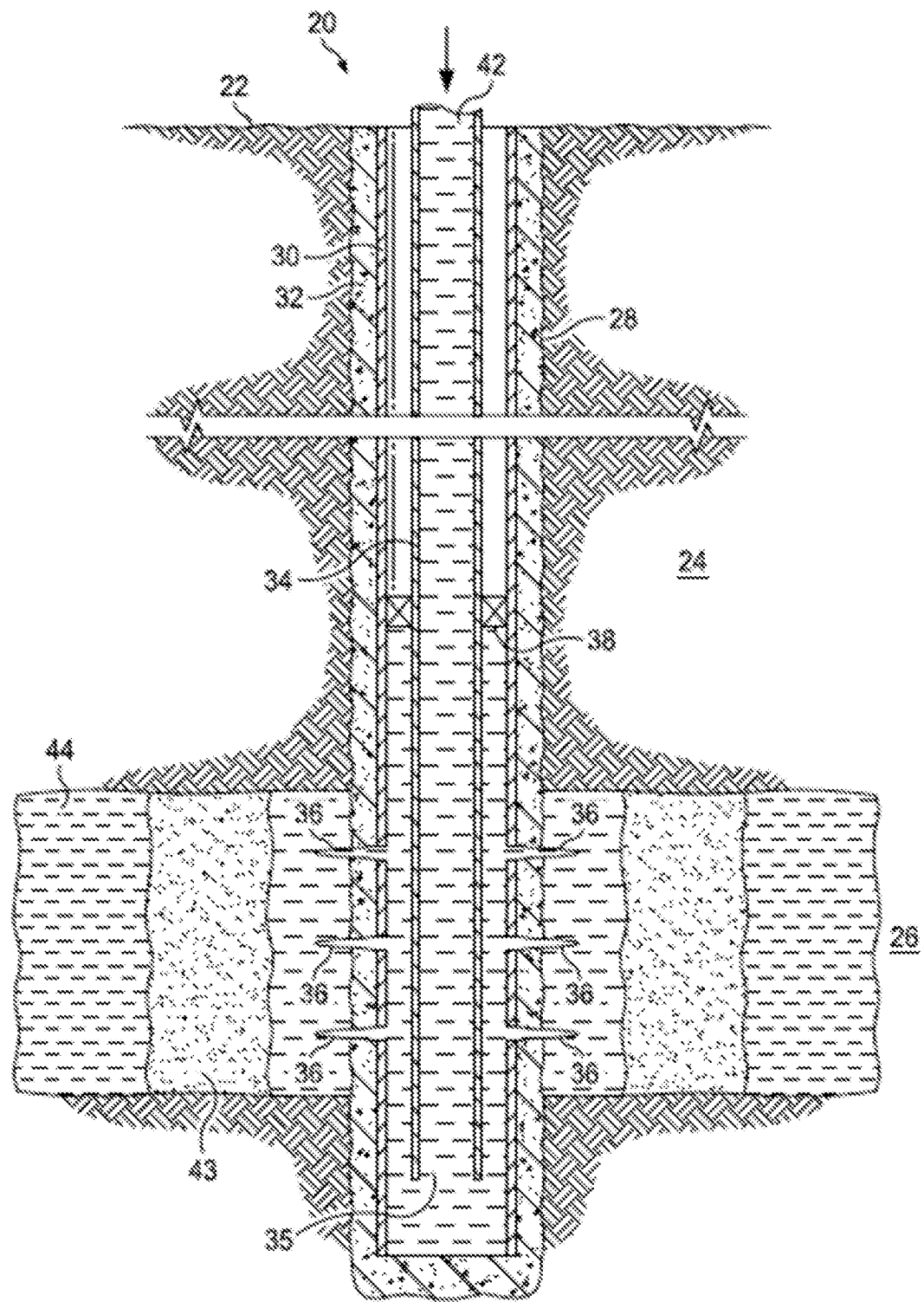
FIG. 8A show a cross section of the closed well with preflush, scale inhibitor and push fluids penetrating the reservoir sequentially.

By reference to FIG. 8, a well 20 is shown. Well 20 comprises a wellbore 28 positioned from a surface 22 through a subterranean formation 24 which may comprise a plurality of naturally-occurring overburden formations which overlie an oil- or gas-bearing naturally-occurring formation 26.

A well casing 30 is positioned in wellbore 28 and cemented in place with cement 32. A tubing 34 extends downwardly through casing 30 to near the bottom of well 20. Perforations 36 are positioned through casing 30, cement 32 and into subterranean 26. A packer 38 is positioned above formation 26 in casing 30 so that when the mixture is injected downwardly through tubing 34 it passes downwardly through tubing 34 out through a lower end 35 of tubing 34 and then with continued pumping of liquid through tubing 34 the mixture is pushed through perforations 36 into formation 26. A second liquid, which can be a simple carrier hydrocarbon liquid, can be used to push the mixture downwardly through and out of tubing 34 by injecting the second liquid as a pusher fluid to a level 44 in tubing 34. It will be understood that well 20 could include any arbitrary angle.

Typically, the preflush composition 44 of the present invention will be injected first, followed by scale inhibitor fluid 43, and followed by a push fluid 42. After the composition has been allowed to remain in place for a selected time, as discussed above, the composition is recovered from formation 26 by simply pumping fluids from well 20 up tubing 34, as is commonly done to produce fluids from formation 26. Well 20 may include a pump (not shown) without departing from the spirit of the present invention.

Figure 8B:
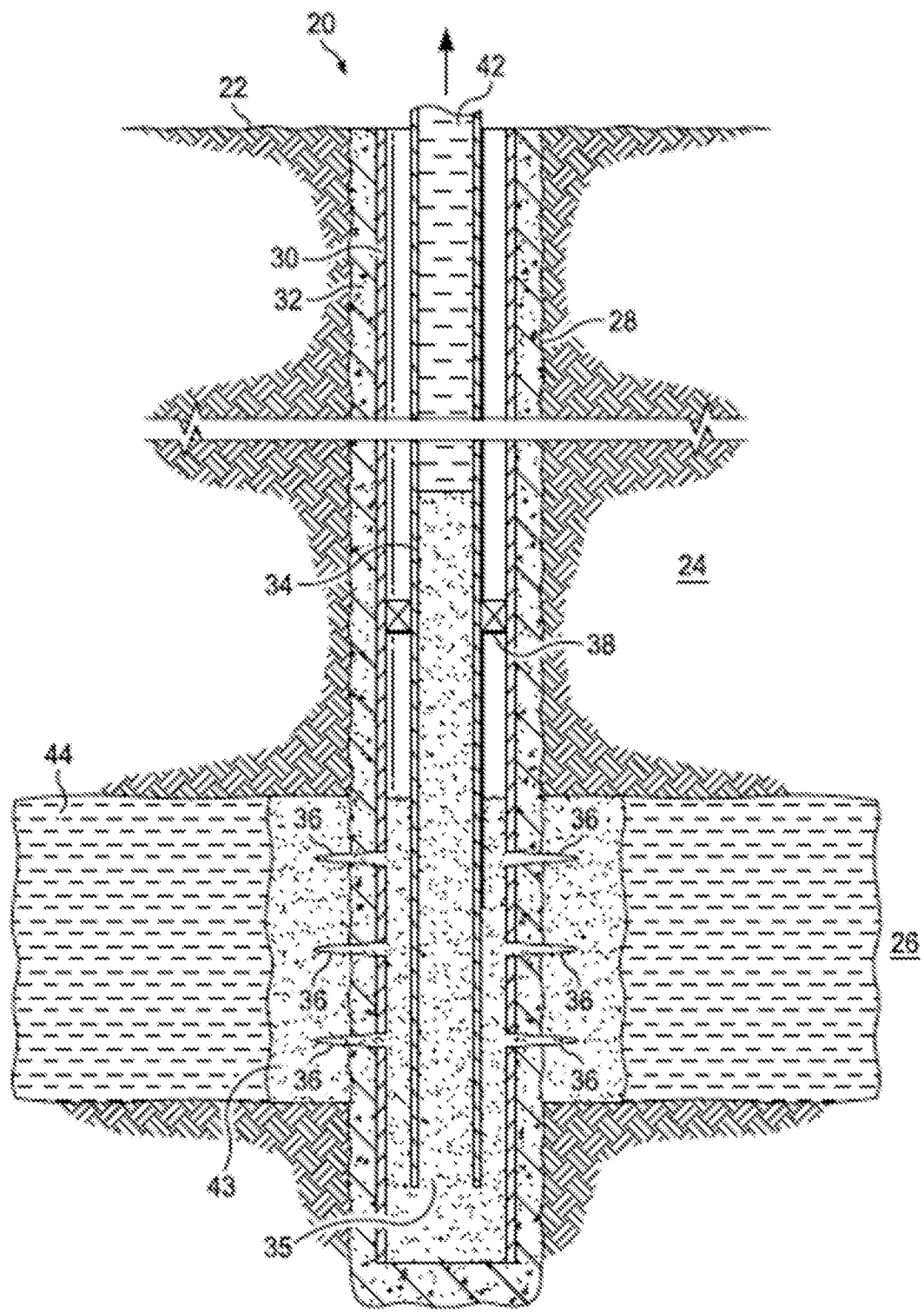
In FIG. 8B, the well has been opened, and push fluid has backflowed completely out of the well, and scale inhibitor is in the process of backflowing out of the well.
Figure 8C:
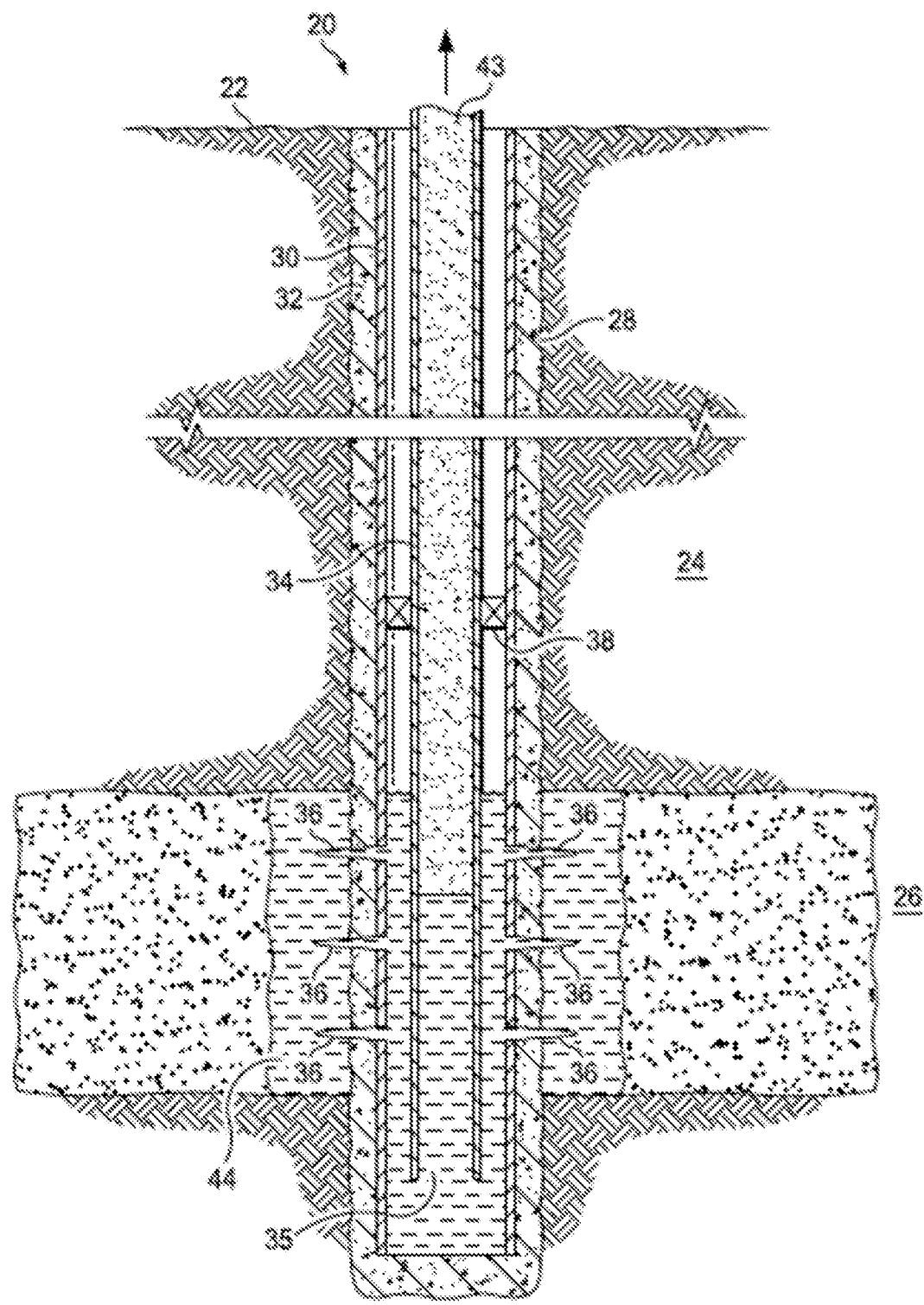
In FIG. 8C, the preflush is now backflowing thus is the last fluid to sweep the near wellbore reservoir, collecting all water.

The last fluid in is the first fluid out, and in this simple illustration is push fluid 43 out first, followed by scale inhibitor fluid 43 in FIG. 8B, and finally in FIG. 8C by the preflush fluid 44. Since preflush was the first in, it is the last out during backflow. The preflush forms Type III or IV microemulsions with any water left behind by the push or scale inhibitor fluids, and thus the backflow of the preflush solution carries water out of the well. Thus the formation is swept of damaging water in the near wellbore region.

It has been found that the use of this composition has been effective to remove water from the near-wellbore portions of subterranean formations down to, and in some instances below, the connate water saturation level of the formation. As a result increased oil production has been achieved.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 6,911,417, Jun. 28, 2005 (Chan; Erwin); "Water block removal with surfactant based hydrocarbonaceous liquid system" (2005).
2. Jones et al., Cosurfactants in micellar systems used for tertiary oil recovery. SPE 5566, June 1976.
3. Meyers and Salter, The effect of oil/brine ratio on surfactant adsorption from microemulsion. Society of Petroleum Engineers Journal, August 1981, 500-512.
4. Powell et al. Optimization of scale inhibitor squeeze procedures in a north slope oil field. Corrosion 96, The Nace International Annual Conference and Exposition, Paper No. 185, 1996.
5. Shuler, P. J. 1993. Mathematical Model for the Scale-Inhibitor Squeeze Process Based on the Langmuir Adsorption Isotherm. Presented at the SPE International Symposium on Oilfield Chemistry, New Orleans, La., 2-5 Mar. 1993. SPE-25162-MS.
6. SPE: 121857-MS: Vazquez, O., et al., Impact of Mutual Solvent Preflushes on Scale Squeeze Treatments: Extended Squeeze Lifetime and Improved Well Clean-up Time (2009).
7. Yuan, M. D., Sorbie, K. S., Todd, A. C. et al. 1993. The Modelling of Adsorption and Precipitation Scale Inhibitor Squeeze Treatments in North Sea Fields. Presented at the SPE International Symposium on Oilfield Chemistry, New Orleans, 2-5 March. SPE-25163-MS.

The invention claimed is:

1. An improved method of scale inhibitor squeeze treatment, said treatment comprising injecting a scale inhibitor into a wellbore, injecting a push solution into said wellbore, shutting said well in for a period of time, and opening said well for flowback of said injected fluids and subsequent production of oil, the improvement comprising injecting a preflush solution into said wellbore before injecting a scale inhibitor into said wellbore, wherein said preflush solution comprises at least 90 volume percent petroleum miscible fluid, at least 1 volume percent alkyl polyglycoside (APG), at least 0.5 volume percent ethoxylated alcohol (EA) or alcohol ethoxysulfates (AES), and at least 1 volume percent linear alcohol, wherein said preflush solution is capable of forming a Winsor Type III or Type IV microemulsion with water, and wherein increased oil production is achieved by said method as compared with a similar method in a similar wellbore but not using said preflush solution.

2. The method of claim 1, wherein said alkyl polyglycosides are C10-C14 alkyl polyglucosides, said ethoxylated alcohols are C9-C15 with an average of about 12 ethylene oxide groups, and said alcohols are about C6-C12.

3. The method of claim 1, wherein said preflush solution comprises 94.28% diesel, 2.51% GLUCOPON® 600 CSUP, 1.09% TOMADOL® 91-2.5, 0.12% TOMADOL® 25-12, 1% n-hexanol, and 1% n-octanol.

4. The method of claim 1, wherein said preflush solution comprises 92% C8-C14 hydrocarbons; 3% GLUCOPON® 600 UP; 1% TOMADOL® 91-2.5; 2% n-butanol; and 1% n-hexanol.

5. The method of claim 1, wherein said preflush solution comprises 95% C10-C14 hydrocarbons; 2% TRITON® CG-600; 2% TERGITOL® 15-S-3; 0.5% n-butanol and 0.5% n-hexanol.

6. The method of claim 1, wherein said APG are C8-C16, said EA or AES are C8-C15 with an average of about 2-14 ethylene oxide groups, and said alcohols are about C4-C15.

7. A scale inhibitor squeeze method for minimizing scaling in a reservoir, comprising:
 a) injecting a preflush solution into a wellbore in a reservoir;
 b) injecting a scale inhibitor fluid into said wellbore;
 c) injecting a push fluid to push the injected scale inhibitor fluid into the reservoir surrounding said wellbore;
 d) shutting in said wellbore for a period of time;
 e) opening said wellbore for back flow of said push fluid and said scale inhibitor fluid and lastly for back flow of said preflush solution; and
 f) producing a hydrocarbon reservoir fluid from said wellbore;
 wherein said preflush solution comprises at least 90 vol % petroleum miscible fluid, at least 1 vol % alkyl polyglycoside (APG), at least 0.5 vol % ethoxylated alcohol (EA) or alcohol ethoxysulfates (AES), and at least 1 vol % linear alcohol, and wherein said preflush solution forms a Winsor Type III or Type IV microemulsion with water.

8. The method of claim 7, wherein said preflush fluid penetrates at least 0.5-5 feet into said reservoir.

9. The method of claim 7, wherein said preflush fluid penetrates at least 0.5-8 feet into said reservoir.

10. The method of claim 7, wherein said push fluid comprises brine or hydrocarbon.

11. The method of claim 7, wherein said push fluid comprises said preflush solution.

12. The method of claim 7, wherein said preflush solution forms a Type III or Type IV microemulsion with any water left behind from said backflowed push fluid and said scale inhibitor fluid, thus removing said water on backflow of said microemulsion.

13. The method of claim 7, wherein the rate of production of said hydrocarbon reservoir fluid is at least as good after said method as it was before said method.

14. The method of claim 7, wherein the rate of production of said hydrocarbon reservoir fluid is improved after said method over what it was before said method.

* * * * *